(12) United States Patent
Fritzel et al.

(10) Patent No.: US 8,125,621 B2
(45) Date of Patent: Feb. 28, 2012

(54) ARRANGEMENT AND METHOD FOR THE WIRELESS TRANSMISSION OF PHASE-CRITICAL SIGNALS WHEN THE LENGTH OF THE TRANSMISSION IS VARIABLE

(75) Inventors: Torsten Fritzel, Munich (DE); Hans-Juergen Steiner, Munich (DE)

(73) Assignee: Astrium GmbH, Munich (DE)

( * ) Notice: Subject to any disclaimer, the term of this patent is extended or adjusted under 35 U.S.C. 154(b) by 336 days.

(21) Appl. No.: 12/467,705

(22) Filed: May 18, 2009

(65) Prior Publication Data

US 2009/0284417 A1 Nov. 19, 2009

(30) Foreign Application Priority Data

May 19, 2008 (DE) .......................... 10 2008 024 134

(51) Int. Cl.
*G01C 3/08* (2006.01)
(52) U.S. Cl. ...................................... 356/5.01
(58) Field of Classification Search .................. 356/385, 356/5.1
See application file for complete search history.

(56) References Cited

U.S. PATENT DOCUMENTS

| 3,788,743 | A | * | 1/1974 | George | 356/28 |
| 4,048,572 | A | * | 9/1977 | Dogliotti et al. | 375/371 |
| 4,054,881 | A | * | 10/1977 | Raab | 342/448 |
| 4,734,702 | A | * | 3/1988 | Kaplan | 342/424 |
| 4,894,662 | A | * | 1/1990 | Counselman | 342/357.25 |
| 6,208,283 | B1 | * | 3/2001 | Murata et al. | 342/25 R |
| 6,255,992 | B1 | * | 7/2001 | Madden | 342/424 |
| 7,843,379 | B2 | * | 11/2010 | Menzer et al. | 342/118 |
| 7,903,022 | B2 | * | 3/2011 | Ohara et al. | 342/127 |
| 2009/0152391 | A1 | * | 6/2009 | McWhirk | 244/30 |

FOREIGN PATENT DOCUMENTS

| JP | 4-119499 A | 4/1992 |
| WO | WO 01/50145 A2 | 7/2001 |

OTHER PUBLICATIONS

German Office Action dated May 19, 2008 (Four (4) pages).

* cited by examiner

*Primary Examiner* — Thomas Tarcza
*Assistant Examiner* — Antoine J Bedard
(74) *Attorney, Agent, or Firm* — Crowell & Moring LLP

(57) ABSTRACT

A method and apparatus for wireless transmission of electrically complex or phase-critical signals includes a device for measuring the length of a transmission route to a moving platform, and a device for transmitting complex measuring or reference signals. According to the invention, components of the device for transmitting the signals are arranged adjacent components of the device for measuring the length of the transmission route, so that changes of the length of the transmission route are the same for both devices.

15 Claims, 2 Drawing Sheets

ARRANGEMENT AND METHOD FOR THE WIRELESS TRANSMISSION OF PHASE-CRITICAL SIGNALS WHEN THE LENGTH OF THE TRANSMISSION IS VARIABLE

BACKGROUND AND SUMMARY OF THE INVENTION

This application claims the priority of German patent document 10 2008 024 134.2-55, filed May 19, 2008, the disclosure of which is expressly incorporated by reference herein.

The present invention relates to a method and apparatus for wireless transmission of an electrically complex signal, in which the length of the transmission route is measured, for the purpose of correcting the phase response to changes in the length of the transmission route.

This method is of importance, for example, in the complex characterization of large electromagnetic fields, particularly for antenna near-field measurements. As a result, for example, floating or flying moving platforms could be used to position antenna measuring heads, for which line transmission of complex signals (for example, measuring or reference signals) would not be possible or could be implemented only at a high risk or with high expenditures.

In the state of the art, line transmission of signals has been used to transmit the complex characterization of electromagnetic fields, particularly for high-frequency or antenna near-field measurements. However, such line transmission is limited to stationary measuring systems of limited size, because of limited lengths when arranging moving and phase-sensitive high-frequency lines.

One problem that occurs in a wireless transmission of measuring signals is the phase shift which occurs as a result of the continuous length change of the wireless transmission route between a flying platform and the ground station. Such phase shift does not occur in line transmission because of the constant line length (or it occurs only to a minor extent, due to elongation or twisting of the line).

It therefore is an object of the present invention to provide a method and apparatus which permit wireless transmission of a complex signal, which make it possible to correct the phase response that is caused by the length of the transmission route.

This and other objects and advantages are achieved by the method and apparatus according to the present invention, which includes a provision for measuring the length of a transmission route to a moving platform, as well as for transmitting complex measuring or reference signals. Components of a device for transmitting complex measuring or reference signals are arranged beside components of a device for measuring the length of the transmission route to the moving platform, so that the changes of the length of the transmission route are the same for both devices.

According to a further feature of the invention, the components for measuring the length of the transmission route and the components for transmitting complex measuring signals or reference signals are mounted on a common motional axis. Moreover, one of the devices may be a stationary ground-side device or a moving device, and the platform is a moving platform. Alternatively, the platform itself may be a stationary device.

The invention also includes a method for wireless transmission of phase critical signals for a system, such as described above, in which measurement of the length of the transmission route occurs isochronously.

Other objects, advantages and novel features of the present invention will become apparent from the following detailed description of the invention when considered in conjunction with the accompanying drawings.

DETAILED DESCRIPTION OF THE DRAWINGS

Figure 1:
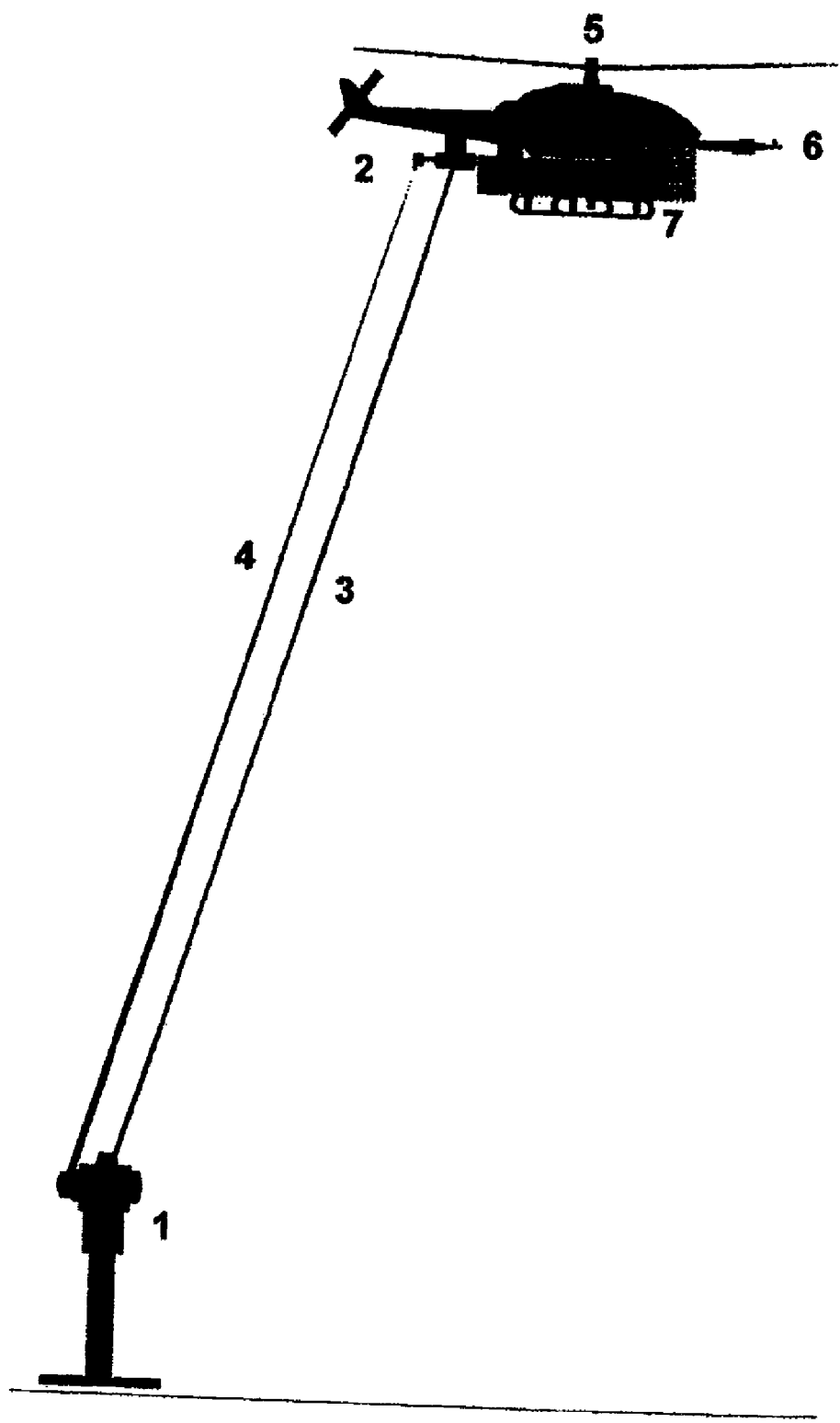
FIG. 1 is a schematic illustration that shows an embodiment of the invention which utilizes laser technology.

FIG. 1 illustrates an arrangement according to the present invention, which includes a ground-side device 1 and a moving platform 5. The ground-side device 1 is equipped for measuring the length of the transmission route from the ground-side device 1 to the moving platform 5. Furthermore, the ground-side device 1 also transmits or receives complex measuring and reference signals. (FIG. 1 does not show the ground-side high-frequency instrumentation for generating the measuring or reference signals for the further signal evaluation.)

Figure 2:
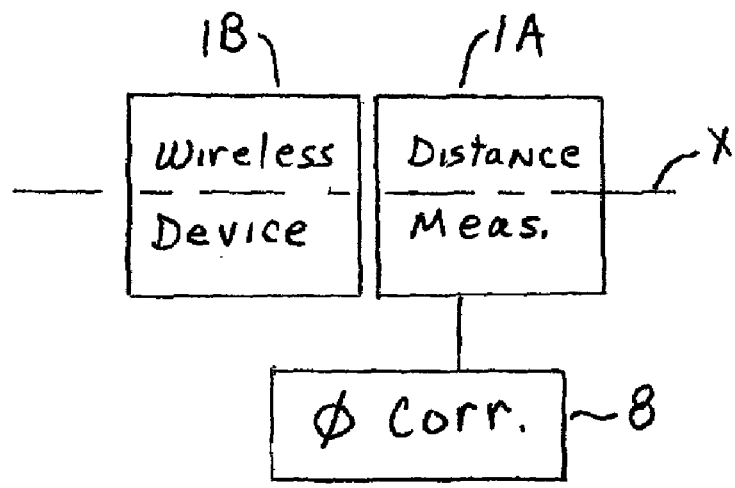
FIG. 2 is a block diagram which shows the components of a phase correction segment of the invention.

As also depicted in FIG. 2, the components for the distance measuring 1A and for the signal transmission 1B are mounted on a common motional axis (x), which ensures that the measured distances correspond to the transmission route; apart from a possible offset in the longitudinal direction. In other words, the devices for the transmission of the electrically complex measuring signal are arranged beside the distance-measuring devices such that the distance changes of both devices will always be the same. In the illustrated example (FIG. 1), the electric measuring signal is modulated onto a free-space laser beam 3 and is optically transmitted parallel to the distance measuring path 4.

Phase correction is performed in a phase correction unit 8, for example, by electronic phase shifting or by aftertreatment or post processing, based on the measured path differences.

FIG. 1 further shows a moving platform 5, such as a remote-controlled miniature helicopter. Movement of the platform 5 causes a continuous change of the length of the transmission route, which in turn causes a considerable phase response. The latter must be compensated, for example, for the application of the antenna near-field measuring procedure.

The platform 5 comprises a platform-side device 2, which is the target of the length measurement, for example, of a laser beam 3. In addition, the device 2 is also the source or receiving part for the (high-frequency) measuring or reference signal to be transmitted. The platform 6 further comprises an antenna sensor 6, for example, for detecting an antenna radiation field, and a transmitting and/or receiving device 7 for operating the field sensor 6 and for the conversion to an optical transmission medium.

In comparison to the above-described embodiments, in further embodiments of the invention, the device 1 itself is moving and the platform 5 is stationary, or the device 1 and the platform 5 are both moving. The moving devices 1 or platforms 5 may in this case be ground-bound or not (for example, they may be flying or suspended at a crane).

In further embodiments of the invention, the laser beams 3 and 4 are combined to form one beam. According to the invention, this is possible for each of the above-mentioned embodiments.

In further embodiments of the invention, instead of the above-described optical variant, which uses a laser beam, electromagnetic or acoustic media may be used as the transmission medium. According to the invention, this is possible for each of the above-mentioned embodiments.

Figure 3:
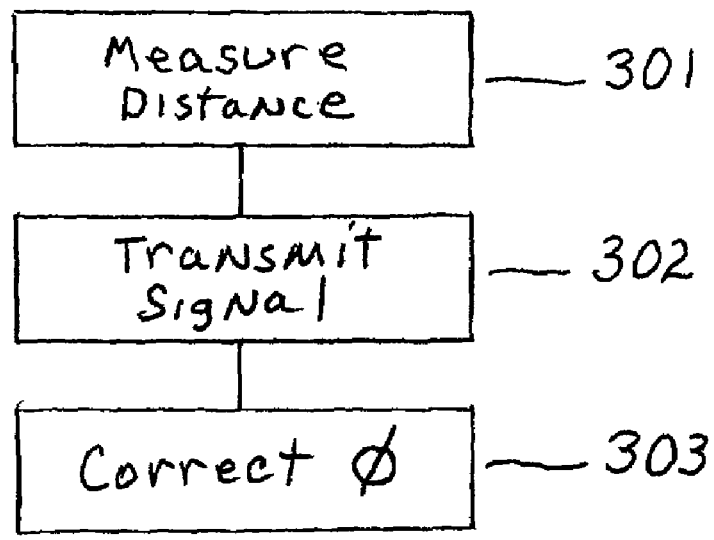
FIG. 3 is a flow chart which illustrates the method according to the invention.

As shown in FIG. 3, in the method according to the invention, a first step 301 comprises a precise and isochronous measurement of the length of the transmission route. This can take place by different known distance measuring methods, such as, for example, satellite-supported distance measuring or ultrasonic measurements. The illustrated method is based on an optical distance measurement, as, for example, by laser interferometry.

The apparatus for transmission of the electrically complex measuring signal is arranged beside the distance-measuring apparatus, so that the distance changes of both devices are always the same. In the illustrated example, the electric measuring signal is modulated onto a free-space laser beam 3 and optically transmitted parallel to the distance measuring path 4 (Step 302).

Based on the information obtained in this manner, the phase of the signal can be corrected (Step 303) by relevant methods in an almost isochronous manner; for example, by corresponding electric phase shifters. Another method of correcting the phase response is that of a corresponding aftertreatment or post-processing based on the measured path difference, and computing from the wavelength of the high-frequency signal. As a result, the phase problem is solved.

The above-described method can be used for all above-described embodiments of the invention.

Particularly important advantages are obtained from the invention by (1) significantly improved measuring and verification possibilities of large and stationary antenna devices and large objects, such as airplanes, in which the beaming characteristics of antennas in the installed condition are of special interest, and (2) the same applies to installations with a high antenna density which may influence one another, as, for example, mainly on military ships but also in the case of crowded mobile communication transmission installations.

Another use of the invention is for measuring of large satellite ground station antennas or radio telescope antennas.

In addition to the antenna measuring procedure, the described arrangement can also be used in a slightly modified manner for the validation of, for example, satellite and/or terrestrial navigation/position signals within relatively large measuring volumes. For this purpose, the antenna measuring head 6 would have to be exchanged for a, for example, GPS/Galileo antenna. The position data generated by the transmitting/receiving device 7 could then be compared with the significantly more precise position measurements of the laser measuring device 1 and 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising:
a first device for measuring the length of a transmission route to a platform;
a second device for transmitting complex measuring or reference signals; and
apparatus for correcting said complex measuring or reference signals transmitted by said second device, based on the length of said transmission route measured by said first device; wherein
components of the second device are mounted adjacent components of the first device such that the changes of the length of the transmission route are the same for both devices.

2. The system according to claim 1, wherein
at least the components of the first device and at least the components of the second device are mounted on a common motional axis.

3. A system comprising a platform and apparatus according to claim 1.

4. The system according to claim 3, wherein:
the first and second devices are stationary and are mounted ground-side; and
the platform is a moving platform.

5. The system according to claim 3, wherein:
the first and second devices are moveable; and
the platform is moveable.

6. The system according to claim 3, wherein:
the first and second devices are moveable; and
the platform is stationary.

7. A method for wireless transmission of phase-critical signals for a system comprising a first device for measuring the length of a transmission route to a platform; and a second device for transmitting complex measuring or reference signals; wherein components of the second device are mounted adjacent components of the first device such that the changes of the length of the transmission route are the same for both devices; wherein:
the length of the transmission route is measured isochronously; and
said complex measuring or reference signals transmitted by said second device, are corrected based on the length of said transmission route measured by said first device.

8. Apparatus for wireless transmission of phase-critical signals between first and second relatively movable locations, said apparatus comprising:
a wireless device for transmitting or receiving said phase-critical signals via a transmission path between said first location and said second location, said transmission path having a path length that varies in response to relative movement of said first and second locations;
measurement apparatus for measuring said path length; and
apparatus for correcting a phase of said phase-critical signal received at one said first and second locations based on said measured path length;
wherein, said wireless device and said measurement apparatus are mounted adjacent, and in close proximity, to each other, such that changes in said path length are the same for both said transmitter and said measurement apparatus.

9. The apparatus according to claim 8, wherein:
said wireless device and said measurement apparatus are mounted at said first location, which is fixed; and
said second location comprises a movable platform.

10. The apparatus according to claim 8, wherein:
said wireless device and said measurement apparatus are mounted at said first location which is movable; and
said second location is fixed.

11. The apparatus according to claim 8, wherein both of said first and second locations are movable.

12. The apparatus according to claim 9, wherein said signal is transmitted from said first location to said second location.

13. The apparatus according to claim 9, wherein said signal is transmitted from said second location to said first location.

14. The apparatus according to claim 10, wherein said signal is transmitted from said first location to said second location.

15. The apparatus according to claim 10, wherein said signal is transmitted from said second location to said first location.

* * * * *